(12) United States Patent
Das

(10) Patent No.: US 10,142,415 B2
(45) Date of Patent: Nov. 27, 2018

(54) DATA MIGRATION

(71) Applicant: Hewlett Packard Enterprise Development LP, Houston, TX (US)

(72) Inventor: Abhik Das, Bangalore (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 140 days.

(21) Appl. No.: 15/112,861

(22) PCT Filed: Jan. 28, 2014

(86) PCT No.: PCT/US2014/013454
§ 371 (c)(1),
(2) Date: Jul. 20, 2016

(87) PCT Pub. No.: WO2015/116040
PCT Pub. Date: Aug. 6, 2015

(65) Prior Publication Data
US 2016/0344810 A1    Nov. 24, 2016

(51) Int. Cl.
*H04L 29/08* (2006.01)
*G06F 3/06* (2006.01)
*H04L 29/12* (2006.01)

(52) U.S. Cl.
CPC .......... *H04L 67/1095* (2013.01); *G06F 3/067* (2013.01); *G06F 3/0617* (2013.01); *G06F 3/0647* (2013.01); *H04L 61/1582* (2013.01)

(58) Field of Classification Search
CPC ...... G06F 3/067; G06F 3/0619; G06F 3/0647; G06F 11/2094; G06F 11/1402; G06F 11/1471; G06F 17/30174; G06F 17/30233; G06F 17/30312; G06F 17/30371; G06F 17/30377; G06F 17/30575; G06F 17/30578; G06F 21/31; G06F 3/0617; G06F 3/0665; H04L 67/1095; H04L 67/108
See application file for complete search history.

(56) References Cited

U.S. PATENT DOCUMENTS

| | | | |
|---|---|---|---|
| 6,151,608 A | 11/2000 | Abrams | |
| 7,263,593 B2 * | 8/2007 | Honda | G06F 3/0605 370/379 |
| 7,698,308 B2 | 4/2010 | Kan et al. | |
| 8,131,682 B2 | 3/2012 | Kitamura | |

(Continued)

OTHER PUBLICATIONS

International Search Report & Written Opinion received in PCT Application No. PCT/US2014/013454, dated Jul. 29, 2014, 9 pages.

(Continued)

*Primary Examiner* — Ninos Donabed
(74) *Attorney, Agent, or Firm* — Patent Law Offices of David Millers

(57) ABSTRACT

Data migration data may include analyzing data to be migrated from a first device to identify data blocks containing content that is the same at an abstraction layer and constructing a content map. Entries in the content map may respectively correspond to unique contents found at the abstraction layer, and each of the entries may include a list of addresses at which the unique content corresponding to the entry can be found. The unique contents may be sent from the first device to the second device and written in the second device at addresses selected based on the content map and using the abstraction layer in the second device.

16 Claims, 5 Drawing Sheets

(56) References Cited

U.S. PATENT DOCUMENTS

| | | | |
|---|---|---|---|
| 8,291,159 B2* | 10/2012 | Rajagopal | G06F 3/0605 709/226 |
| 8,554,918 B1 | 10/2013 | Douglis | |
| 8,572,343 B2 | 10/2013 | Paul et al. | |
| 8,572,352 B2 | 10/2013 | Honda et al. | |
| 8,577,836 B2 | 11/2013 | Kopylovitz et al. | |
| 8,577,934 B2 | 11/2013 | Starr et al. | |
| 8,577,938 B2 | 11/2013 | Yeh et al. | |
| 8,578,113 B2 | 11/2013 | Anderson et al. | |
| 8,601,220 B1 | 12/2013 | Corbin et al. | |
| 9,134,922 B2* | 9/2015 | Rajagopal | G06F 3/0605 |
| 2005/0193167 A1* | 9/2005 | Eguchi | G06F 3/061 711/114 |
| 2006/0161752 A1* | 7/2006 | Burkey | G06F 3/0605 711/170 |
| 2006/0212516 A1 | 9/2006 | Shikatani | |
| 2008/0235448 A1* | 9/2008 | Inoue | G06F 3/061 711/114 |
| 2010/0235832 A1* | 9/2010 | Rajagopal | G06F 3/0605 718/1 |
| 2011/0061049 A1* | 3/2011 | Kobayashi | G06F 3/0617 718/1 |
| 2011/0283062 A1 | 11/2011 | Kumagai et al. | |
| 2012/0005307 A1* | 1/2012 | Das | G06F 17/30138 709/219 |
| 2012/0095957 A1 | 4/2012 | Reddy et al. | |
| 2012/0317395 A1 | 12/2012 | Segev et al. | |
| 2013/0204963 A1 | 8/2013 | Boss et al. | |
| 2014/0095826 A1* | 4/2014 | Rajagopal | G06F 3/0605 711/170 |

OTHER PUBLICATIONS

Tangwongsan, K. et al., "Efficient Similarity Estimation for Systems Exploiting Data Redundancy," (Research Paper), Dec. 21, 2009, 9 pages.

* cited by examiner

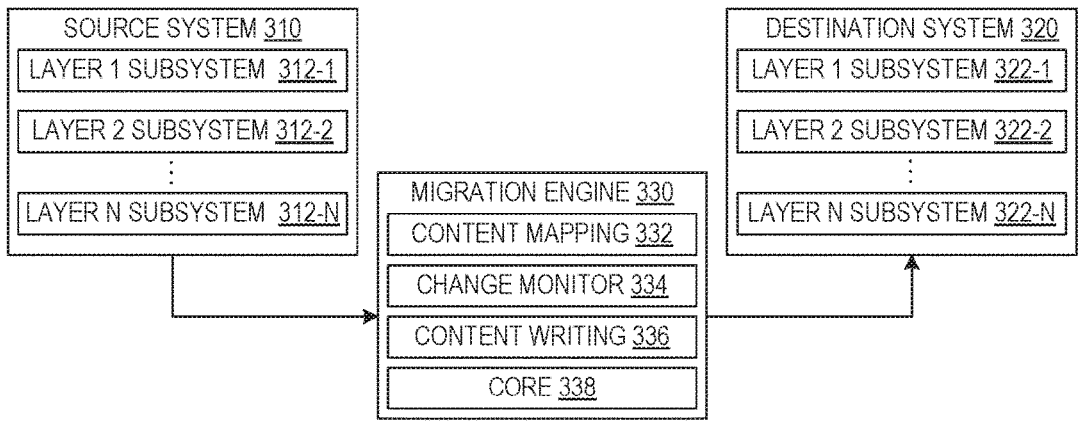
FIG. 3
400
| ADDRESS | 0001 | 0002 | 0003 | 0004 | 0005 | 0006 | 0007 | 0008 | 0009 |
|---------|------|------|------|------|------|------|------|------|------|
| CONTENT | A | B | C | A | D | B | C | C | E |
FIG. 4A
410
| CONTENT | ADDRESS LIST |
|---------|--------------|
| A | 0001, 0004 |
| B | 0002, 0006 |
| C | 0003, 0007, 0008 |
| D | 0005 |
| E | 0009 |
FIG. 4B
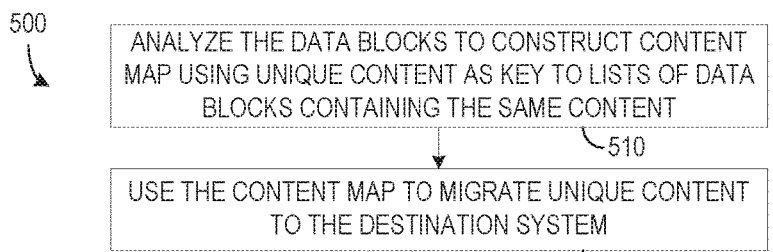
FIG. 5

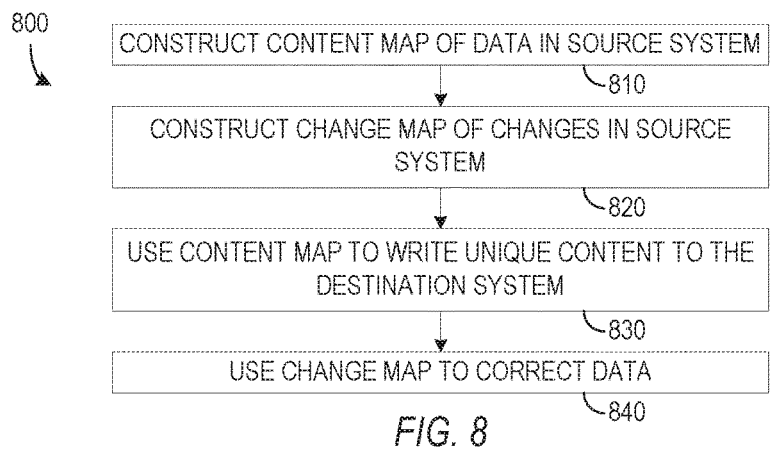
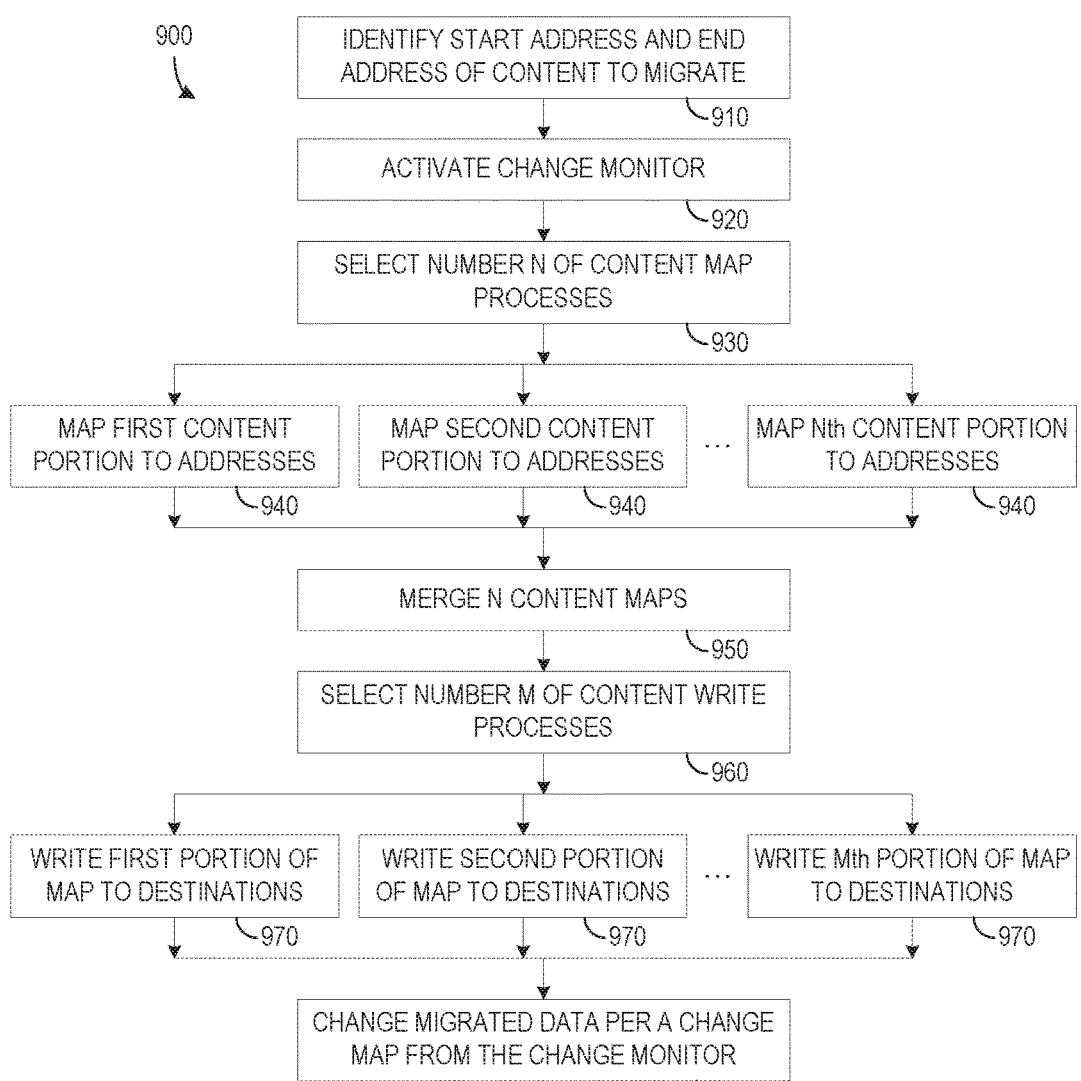

DATA MIGRATION

BACKGROUND

Data migration refers to transfer of data from a source system to a destination system. The source and destination systems may be computers or any devices capable of storing the data. Data migration may be needed, for example, when the source system is being replaced or upgrade, when some function of the source system is otherwise being moved to the destination system, or when the data needs to be temporarily stored elsewhere while an operation such as server maintenance is performed on the source system. Data migration may also be used to consolidate data from multiple sources. In many cases, data migration is complicated by the need to change the format of the data from a format used on the source system to a format suitable for the destination system, for example, because of differences in the way the source and destination systems store or use the data. Data migration is generally an automated process that a computer system may implement. Still, migration of a large amount of data, e.g., a database, can cause a significant amount of downtime for some services in a computer system and may consume significant computing or networking resources of the computer system.

BRIEF DESCRIPTION OF THE DRAWINGS

FIG. 3 illustrates logical relationships between an implementation of a migration engine and subsystems associated with abstraction layers used on source and destination systems.

FIG. 4A illustrates data made up of multiple blocks having addresses and contents interpreted at one abstraction layer.

FIG. 4B illustrates an implementation of a content map of data based on the interpretation of the data shown in FIG. 4A.

FIG. 5 is a flow diagram of one implementation of a migration process.

FIG. 8 is a flow diagram of another implementation of a data migration process that allows and monitors changes to the data being migrated.

FIG. 9 is a flow diagram of another implementation of a data migration process.

Use of the same reference symbols in different figures indicates similar or identical items.

DETAILED DESCRIPTION

Data migration can be made faster or more efficient through analysis of the data to be migrated. In particular, analysis of data at a user-chosen or task-dependent abstraction level or layer can select data blocks and match the content of data blocks at different addresses in the source system. A migration engine including a content mapping module can construct a content map linking addresses containing data blocks with the same content. The amount of data transferred may be reduced by transferring only unique data blocks from the source system to the destination system, where the destination system may store some of the data blocks at multiple addresses according to the content map and the abstraction layer on the destination device. A migration process may thus be faster and may require fewer communication or network resources.

The migration engine in addition to constructing a content map may further include a monitor that detects changes that may occur in the data during the migration process. The migration process can then operate while the data being migrated is available for reading and writing at the source system, and when the migration process is complete, the functional use of the data can be switched to the destination system with little or no downtime when the switch occurs. The monitor in one implementation can construct a change map, so that the migration engine can oversee matching changes of the migrated data in the destination system. The monitoring of changes can be reset each time corrections to the migrated data are made, and the migration process can complete when changes based on a last change map are complete and a change map since the last reset is empty.

Figure 1A:
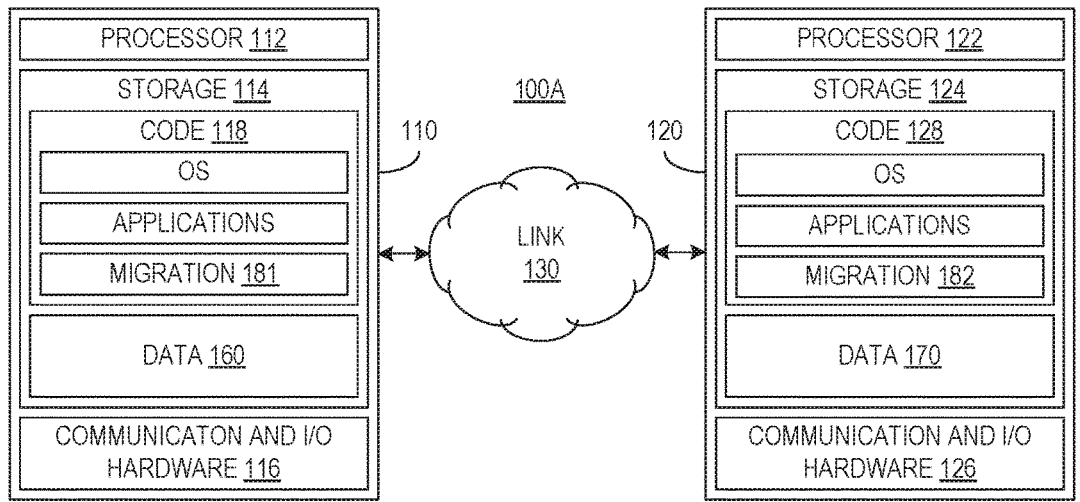
FIGS. 1A and 1B are block diagrams of two implementations of systems capable of data migration processes.

FIG. 1A shows an example of a system 100A in which a data migration process may be performed. System 100A includes a source system 110 and a destination system 120 that are capable of communicating through one or more communication links 130. For example, systems 110 and 120 may communicate with each other over a direct connection forming link 130 between source system 110 and destination system 120, one or more networks implementing link 130, or through an intermediary computer system when no direct connection between systems 110 and 120 exists. Each system 110 and 120 may be a computer system such as a server, personal computer, a storage device, or similar device capable of storing data. In the illustrated implementation, each system 110 or 120 includes a processor 112 or 122, storage 114 or 124, and communication and input/output (I/O) hardware 116 or 126. Such components, e.g., processors 112 and 122, storage 114 and 124, and hardware 116 and 126, of computer systems may be of well known types. Although FIG. 1A may show components contained in the same block, such components may all be incorporated in a single device or housing or may be implemented in two or more separate devices interconnected to operate as system 110 or 120.

Each processor 112 or 122 in system 110 or 120 may employ one or more microprocessors or processing cores with associated hardware for execution of program instructions. For example, processor 112 or 122 may execute code 118 or 128 to implement processes such as an operating system and applications that permit access to or use of data 160. Processors 112 and 122 may also execute respective portions 181 and 182 of a migration engine used to migrate data from source system 110 to destination system 120 as described further below.

Each of storage 114 and 124 may include primary and secondary storage of respective systems 110 and 120. For example, storage 114 or 124 may include primary storage such as DRAM in the addressable space of processor 112 or 122 and secondary storage including one or more data store devices such as disk drives, e.g., hard disk drives or optical disk drives, or semiconductor drives such as may be implemented with flash memory. Accordingly, information in storage 114 or 124 may have addresses in the address space of processor 112 or 122 or addresses defined relative to an address system other than the address space of processor 112 or 122. In particular, a portion of storage 112 or 114 may include information organized by data blocks and having physical cylinder-head-record addresses that identify the data blocks in a disk drive or similarly organized storage device. In another alternative, data blocks may correspond to files distinguished or addressed by file names. The term "address" as used herein refers to any means for identifying logical data blocks, and such logical data blocks may or may not correspond to the physical arrangement or access units or blocks of data on a specific device. As described further below, the addresses for data blocks and how data is partitioned into blocks may depend on an abstraction layer used to interpret the data.

Communication link 130 may be implemented through one or more networks that provide communications between systems 110 and 120. Communication link 130 may include one or more wired or wireless networks that may include private networks or public networks. Also, link 130 may not provide a direct connection. For example, link 130 may include an intermediary computer system capable of separate communications with source system 110 and destination system 120, but source and destination systems 110 and 120 may be unable to directly communication. In such a scenario, a migration engine may reside outside source and destination systems, e.g., in the intermediary computer system of link 130, and the migration engine can serve as a gateway between systems 110 and 120. The particular configuration of communication link 130 is not generally critical to a migration process, except that communication link 130 should be able to transfer blocks of data from source system 110 to destination system 120.

Figure 1B:
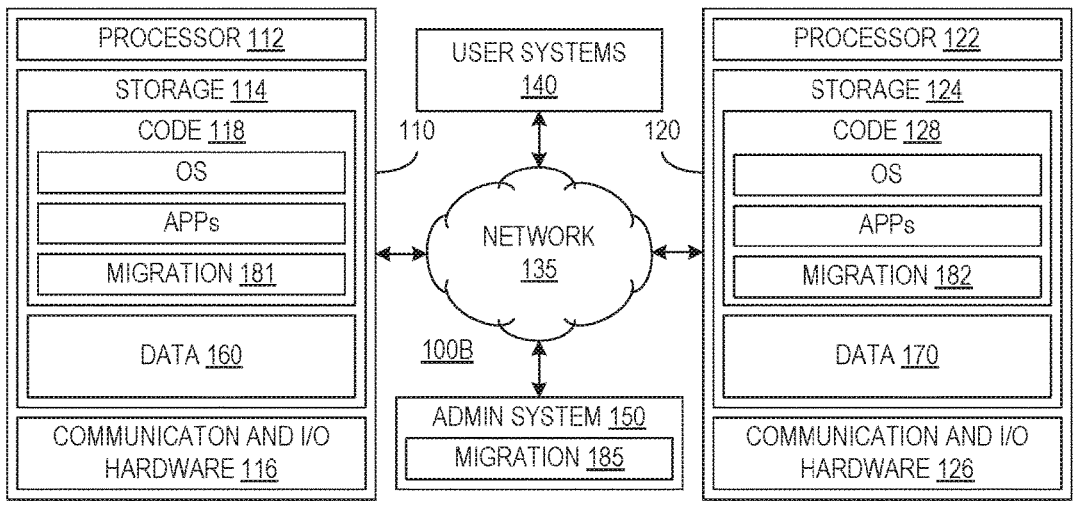

In an implementation shown in FIG. 1B, such communications between systems 110 and 120 are implemented through one or more networks 135 that in general may include a variety of devices such as gateways, routers, and switches and may be coupled to many end-stations in addition to systems 110 and 120. For example, FIG. 1B shows a system 100B that includes systems 110 and 120, one or more user systems 140, and an administrative system 150. For the example of FIG. 1B, user systems 140, e.g., servers, personal computers, lap top computers, tablet computers, or smart phones, may be able to access source system 110 and change data 160 that is to be migrated to destination system 120. In general, continuous access to the data with little or no downtime may be desired. Administrative system 150 may be a user system that plays a part in control or execution of a migration process, and in the implementation of FIG. 1B, administrative system 150 includes a migration module 185 that may be part of a migration engine as described further below.

Data 160 to be migrated from storage 114 in source system 110 may be identified through a range or set of addresses identifying respective data blocks in data 160. A migration engine may include one or more modules, some of which may be implemented through the hardware of system 110 executing code 181. Each block of data 160 may be identified by the addresses of the block, e.g., by start and end addresses of the block, and by the content of the data block. To migrate a block within data 160, a migration process creates within data 170 in storage 124 of destination system 120 a block of data having the same content as the block within data 160.

A direct migration process can send the content of every block from a partition of data 160 to system 120, where corresponding blocks of data 170 are created. However, a more efficient migration process may identify that two or more blocks of data 160 have the same content and exploit the equivalence of data blocks to reduce data to be moved during a migration process. In particular, a migration process may send only one block of content for multiple equivalent data blocks in data 160 from source system 110 to destination system 120, where the block of content is written in multiple locations to create in data 170 multiple blocks corresponding to the multiple equivalent blocks in data 160. Hence, data movement traffic can be reduced, and the time required for the migration may be less. The migration process may also be expedited by distributing tasks across multiple sub-processes, the number of which may be derived from current environmental factors of overall system 100A or 100B.

Figure 2:
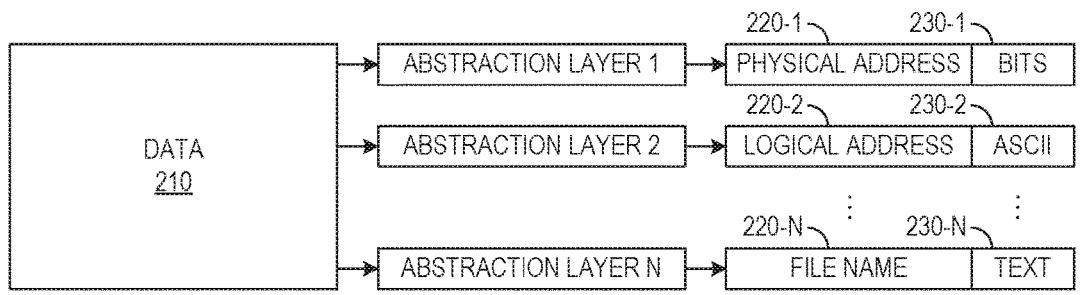
FIG. 2 illustrates different abstraction layer interpretations of the address and content of data.

Data 160 that needs to be migrated from source system 110 to system destination system 170 can often be interpreted at different abstraction levels or abstraction layers. For example, as shown in FIG. 2, data 210 at an abstraction layer N may be divided or partitioned into files having respective addresses corresponding to file names 220-N and respective contents corresponding to text 230-N, where both file names 220-N and text 230-N are human readable and understandable. At a lower abstraction layer 1 of a system, data 210 may be interpreted in terms of fixed-sized blocks of bits 230-1 at specific physical addresses 220-1. At different abstraction layers, the blocks of data may or may not remain human understandable, and the sizes and relationships of blocks may change. However, a system using multiple layers of abstraction generally employs subsystems that can interpret the data according to respective abstraction layers and particularly may help in read/write of the data from or to the layer above or below. For example, an I/O subsystem of an operating system may receive a request from an application layer to read or write to a file system layer, which may cause a volume manager, which is at a lower abstraction layer from the file system layer, to take the request from the file system layer and read or write to the volume layer. FIG. 2 shows that at each abstraction layer interpretation of data 210 may be alternatively characterized by different data contents 220-1, 220-2, . . . 220-N and different address locations 220-1, 220-2, . . . 220-N.

A migration process from source system to destination system may employ an abstraction layer that is used in the source and destination systems, so that at the abstraction layer used, the migrated data in destination system is the same as the data in the source system. The data may not be partitioned in the same manner or may not represent the same content on another layer of abstraction. For example, a migration process that uses abstraction layer N of FIG. 2 may create in the destination system files that have the same file names 220-N and the same readable text 230-N, but the underlying data may be stored at different logical or physical addresses, and the content may be represented using different ASCII codes or hits. Further, the abstraction layer may be chosen for a migration process and provide a partition of the data that is efficient for the data migration. In particular, using a specific abstraction layer for interpretation of data may result in a large number of data content matches when compared to data migration processes that uses fixed size blocks.

FIG. 3 illustrates an implementation in which a source system 310 includes multiple subsystems 312-1 to 312-N that respectively correspond to the abstraction layers 1 to N, and a destination system 320 includes multiple subsystems 322-1 to 322-N that respectively correspond to the abstraction layers 1 to N. Source subsystems 312-1 to 312-N, generically referred to herein as subsystems 312, and destination subsystems 322- to 322-N, generically referred to herein as subsystems 322, may be implemented in dedicated hardware or by a hardware processor executing instructions to read/write contents according to the abstraction layer corresponding to the subsystem 312 or 322. A couple of examples of subsystems 312 or 322 include a subsystem implementing a virtual disk layer on a storage system or a subsystem implementing a physical disk layer of a storage system. Generally, a subsystem 312 can read the content of a data block to be sent to the subsystem 322 corresponding to the same abstraction layer as subsystem 312, and the receiving system 322 can rebuild a block having an address and content at the abstraction layer corresponding to both subsystems 312 and 322. In general, the rebuilding of content may change data because of differences in ways that source system 310 and destination system 320 format data to represent identical content at the relevant abstraction layer.

A migration engine 330 may have an operating parameter specifying an abstraction layer and thus may employ the subsystems 312 and 322 corresponding to that abstraction layer when performing a data migration process. FIG. 3 shows an implementation of migration engine 330 including a content mapping module 332, a change monitor module 334, a content writing module 336, and a core module 338. Content mapping module 332 analyzes the content of data to be migrated as described further below and may construct a content map that maps content to the address or addresses that store the content in source system 310. Change monitor module 334 monitors changes that occur during the data migration process in the data being migrated and may construct a change map as described further below. Content writing module 336 controls writing of data blocks in destination system 320 and may employ the content map and the change map from content mapping module 332 and change monitor module 334. Core module 338 may orchestrate the data migration processes and modules 332, 334, and 336.

Each of modules 332, 334, 336, and 338 may include, for example, hardware devices including electronic circuitry for implementing the functionality described herein. In addition or as an alternative, each module 332, 334, 336, and 338 may be partly or fully implemented by a processor executing instructions encoded on a machine-readable storage medium.

Migration engine 330 may reside entirely within the source system or may reside partially or fully outside of the source system. For example, in system FIG. 1B, migration modules 181 in system 110 may include portions, some, or all of modules 332, 334, 336, and 338, or one or more of modules 332, 334, 336, and 338 may be fully or partially implemented in migration modules 182 of destination system 120 or module 185 of administrative system 150. However, migration engine 330 should have access to both source system 310 and destination system 320.

Content mapping module 334 in one implementation analyzes data to construct a content map. FIG. 4A shows a simple example of data 400 that is partitioned into data blocks corresponding to addresses 0001 to 0009. More generally, the partition of data 400 may depend on the abstraction layer, and the addresses of data blocks are not limited to numeric values but can be expressed using any means, e.g., file names, logical addresses, or physical addresses, for identifying data blocks. Each of data blocks 0001 to 0009 contains content A, B, C, D, or E with contents A, B, and C repeated in multiple data blocks. A content mapping module analyzing data 400 may thus construct a content map 410 as shown in FIG. 4B. Content map 410 includes an entry for each unique content found in any block of data 400. Accordingly, for data 400, data map 410 has five entries corresponding to the unique contents A, B, C, D, and E. Each entry of content map 410 contains a list of one or more addresses at which the corresponding content may be found in data 400. In the illustrated example, the entry corresponding to content A lists two addresses 0001 and 0004 at which content A is found in data 400. The entry corresponding to content B also lists two addresses 0002 and 0006 at which content B is found. The entry corresponding to content C lists three addresses 0003, 0007, and 0008 at which content C is found, and the entries corresponding to contents D and E respectively contain addresses 0005 and 0009. The content map may contain the actual data/contents that are interpretable by corresponding subsystem layer, so that the data/contents mapped to respective entries are conveniently available for operations such comparisons, table lookup operations, or transfers to the destination system.

FIG. 5 is a flow diagram of an implementation of a data migration process 500 that uses a content map such as content map 410 of FIG. 4B. Data migration process 500 in a process block 510 analyzes the data to be migrated from the source system and constructs a content map. The content map may employ unique content as a key or index distinguishing entries, and each entry may include a list of the addresses of storage blocks holding the content associated with the entry. A process block 520 then uses the content map to migrate the unique contents from the source system to the destination system and to copy unique content when necessary in multiple locations in the destination system. Process 500 by transmitting only the unique contents may reduce the volume of information transmitted, which may reduce the time required for migration process 500 when compared to a process that transmits all of the contents without regard to duplication.

Figure 6:
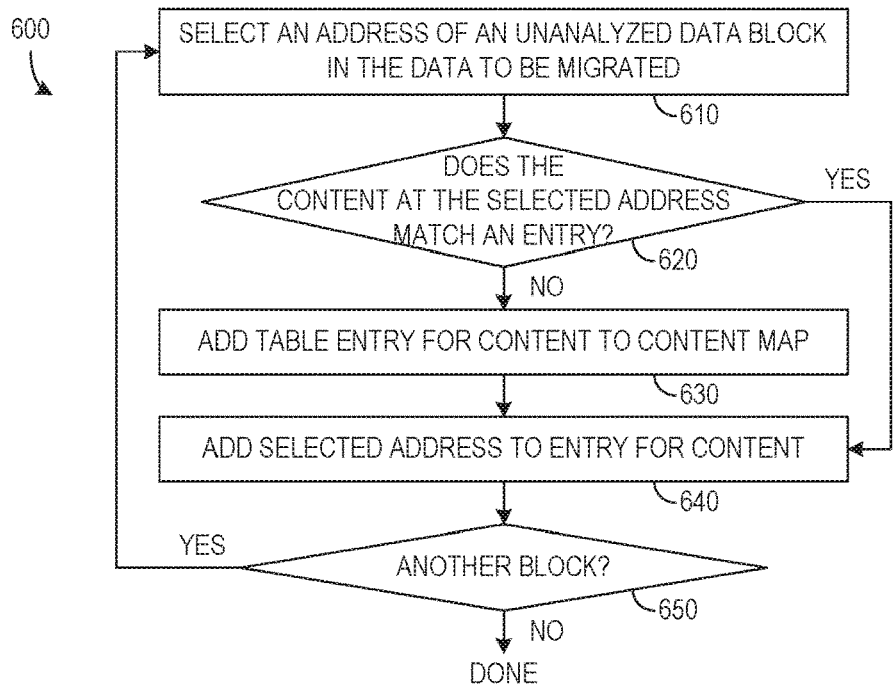
FIG. 6 is a flow diagram of one implementation of a content mapping process that constructs a content map.

FIG. 6 shows an implementation of a process 600 for generating a content map, which could be employed in a migration process such as illustrated in FIG. 5 or employed by a content mapping module such as content mapping module 332 of FIG. 3. In a process block 610, process 600 selects an address corresponding to one of the blocks of the data to be migrated. A decision block 620 then analyzes the data block at the selected address to determine whether that data block matches or is the same as any of the blocks of data corresponding to entries in a content map. The analysis can employ search techniques to identify whether content in the data matches an existing entry in the content map. For example, a search for matching contents in the content map could include a simple linear comparison, multiple comparison threads, or a binary search using the content map that is bucketized in a sorted order of the key/content. Decision block 620 decides whether blocks match based on the level of abstraction chosen for the migration process. If no entry in the content map corresponds to the content in the selected data block, a process block 630 adds a new entry in the content map, and a process block 640 adds the selected address to the new entry just created. For example, the content map may be empty, i.e., have no entries, when the migration process starts, so that the first block analyzed in decision block 620 results in creation of a new entry containing the selected address. If decision block 620 finds that the content map already contains an entry corresponding to the content at the selected address, process 600 jumps to process block 640 and adds the selected address to the entry corresponding to the content at the selected address. A decision block 650 then determines whether any blocks of data to be migrated have not been analyzed. If so, process 600 branches back to process block 610 and selects an address of the next block to be analyzed. If decision block 650 determines that all blocks in the data have been analyzed, process 600 is done, and the content map includes entries respectively corresponding to the unique contents found in the data, and each entry contains one or more addresses for the content corresponding to that entry.

Figure 7:
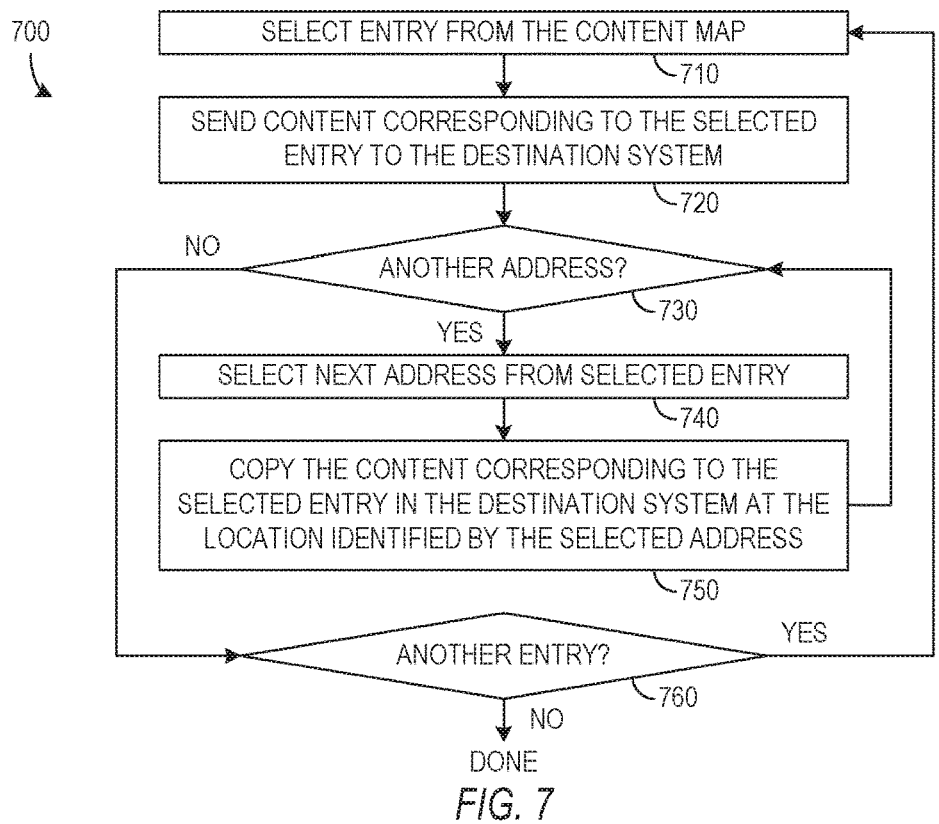
FIG. 7 is a flow diagram of one implementation of a write process using a content map.

FIG. 7 shows an implementation of a process 700 for using a content map, which could be employed in a migration process such as illustrated in FIG. 5 or employed by a content writing module such as content writing module 336 of FIG. 3. Content writing process 700 in a process block 710 selects an entry from the content map for the data being migrated. A process block 720 then sends the content corresponding to the selected entry to the destination system. In particular, a subsystem corresponding to the relevant abstraction layer can read the content from any of the addresses in the entry, and the read content can be sent to the destination system, e.g., with a write instruction to the subsystem corresponding to the relevant abstraction layer in the destination device. A decision block 730 then determines whether there is another address in the selected entry. If so, a process block 740 selects the next address from the selected entry, and a process block 750 copies the content corresponding to the selected entry in the destination system at an address corresponding to the selected address from the selected entry. Since the content is already in the destination device, copying the content in process block 750 does not require resending the content from the source system to the destination system. Process 700 branches back from process block 750 to decision block 730 to determine if there is yet another address in the selected entry. Process blocks 730, 740, and 750 can be repeated until all of the addresses in the selected entry are exhausted. When decision block 730 determines there are no unprocessed addresses in the selected entry, process 700 branches to decision block 760 to determine whether there are any further entries in the content map to select. If so, process 700 branches from decision block 760 back to process block 710 to select a next entry from the content map. When decision block 760 determines there are no more entries in the content map to process, process 700 ends.

The specific implementation of process blocks of process 700 in general may vary according to the location or distribution of a content writing module controlling process 700. For example, if the content writing module is outside the destination system, the content map does not need to be sent to the destination system, process block 720 may correspond to a write instruction sent to the destination system from the content writing module, and process block 750 may correspond to a copy instruction sent to the destination system from the content writing module. Alternatively, if all or a portion of the content writing module is in the destination system, the unique content and the content map can be sent to the destination system, and the portion of the writing module in the destination system can oversee process 700.

The above description of the process of FIGS. 5, 6, and 7 do not address changes that may be made to the data in the source system during a migration process. Changes in the data in the source system are not an issue if such changes are disabled during the migration process, but disabling changes causes downtime for systems that need to write to the data. FIG. 8 is a flow diagram of a process 800 that monitors data changes and assures that the migrated data is up to date when the data migration is complete. Data migration process 800 includes a process block 810 that constructs a content map of the source data, and a block 830 that uses the content map to write data to the destination system. Processes 810 and 830 may be conducted, for example, as indicated above with reference to blocks 510 and 520 in FIG. 5. Additionally, a process block 820 monitors changes in data and constructs a change map. The change map may, for example, indicate changes made to data blocks in the source system after the content of those data blocks have been mapped into the content map. A process block 840 can then use the change map to correct the migrated data, for example, in the destination system.

FIG. 9 is a flow diagram of yet another implementation of a migration process 900. In an initial process block 910, a migration engine communicates with one or more subsystems of the source system that correspond to the chosen abstraction layer to determine a set of addresses, e.g., a start address and an end address, for blocks of the data corresponding to content to be migrated. For example, the migration engine 330 of FIG. 3 may communicate with subsystems 312 and 32 corresponding to the abstraction layer used for the data migration. Content that resides within the range or set of identified addresses may be changing while the migration proceeds. Accordingly, in a process block 920, the migration engine starts a monitor, e.g., change monitor 334 of FIG. 3, to detect and record changes to the relevant content, e.g., all content within the address range or set or alternatively just the content that has already been mapped. The activated change monitor may continue to operate until the migration process 900 is complete or nearly complete.

Content mapping in process 900 includes process blocks 930, 940, and 950 to create a content map in which the key is the content and values are addresses or address lists. In one implementation, a content mapping module of the migration engine controls process blocks 930, 940, and 950. In process block 930, the migration engine checks the current status of the system in which the data migration is running and determines an optimal or desired number of content mapping process blocks 940 to spawn. Each of the parallel process blocks 940 analyzes at least a portion of data to be migrated. For example, when N content mapping process blocks 940 are spawned, the migration engine may partition or divide the data into N portions, e.g., equal portions, that are respectively assigned to N processes 940. A process block 950 can merge the results from process blocks to create a content map for the data to be migrated. Alternatively, if the migration engine runs a single content mapping process 940, merging of partial content maps is not needed. In either case, each instance of a content mapping module in a corresponding process block 940 analyzes the content of its assigned data and checks if content is already a key in its content map. If content is found, the address of the content is appended to the list already associated with the content. If content is not found, the content mapping module creates in the content map a new entry that is keyed to the just analyzed content and contains a value indicating the address of the content just analyzed. As noted above, the contents-to-addresses map can be used to reduce the amount of data to be transferred by virtue of the fact that the content is often duplicated across addresses for many types of data. Less data transferred implies faster transmission from the source system to destination system.

The content map, which is an output of the content mapping module or modules, can be transmitted to the destination system, where a content writing module interacts with the subsystem of the destination system corresponding to the relevant abstraction layer and writes the unique content according to the content map at respective addresses in the destination system. In process 900, the migration engine in process block 960 checks the current status of the environment and decides on an optimal number M of content writing processes 970 to spawn. Process blocks 970 can process portions of content map in parallel. For example, entries in the content map may be equally divided and assigned to process blocks 970 that linearly parse the assigned subsets of content map and write to the destination system. Alternatively, a single content writer process 970 can process the entire content map and write the contents from the content map to respective addresses on the destination system.

Data writing on a computer system often involves processing the data to be written and then actual writing, e.g., actual disk seek and write operations. In particular, a processor may process data for writing, while another subsystem such as a disk controller/disk subsystem controls writing of the processed data. If content map processing is faster than address seeking, the content map may first be expanded to another map having addresses as key to content and the address entries may be ordered or sorted for efficient write operations. For example, if disk seeks are slow, then an efficient way of writing to disk may be in a linear fashion to consecutive physical addresses, while random address writes to addresses given in the content map may be inefficient. Accordingly, process block 960 or process blocks 970 may reformat the content map or otherwise order write operations by address before performing the actual write operations.

Processes 970 when complete generally have migrated historic data from the source system to the destination system. However, the historic data may not be current because changes to the content on the source system may occur throughout process 900. However, the change monitor once activated in process block 920 logs such changes, and the migration engine may query the change monitor for changes on a target address range or set. If no change were logged, migration of the target address range or set is termed complete, and the destination system can assume services involving the data that the source system had provided. If the monitor logged changes, the migration engine needs to propagate these changes from the source system to the destination system before the destination system assumes tasks of the source system. A process block 980 corrects the migrated data to reflect the logged changes. For example, in one implementation, the migration engine instructs the abstraction layer of the source system to reject all content writes during process block 980. The change map which is generally much smaller than the historic data moved may be sent to a content writing module for writing on the destination system. On completion of the changes, the migration engine may instruct the corresponding layer subsystem to resume writes to the data now on the destination system, and the migration is termed complete. If writing that changes the migrated data is disabled during process 980, downtime for the service involving the data may be shorter than if writing were disabled for the data migration process preceding process block 980.

Figure 10:
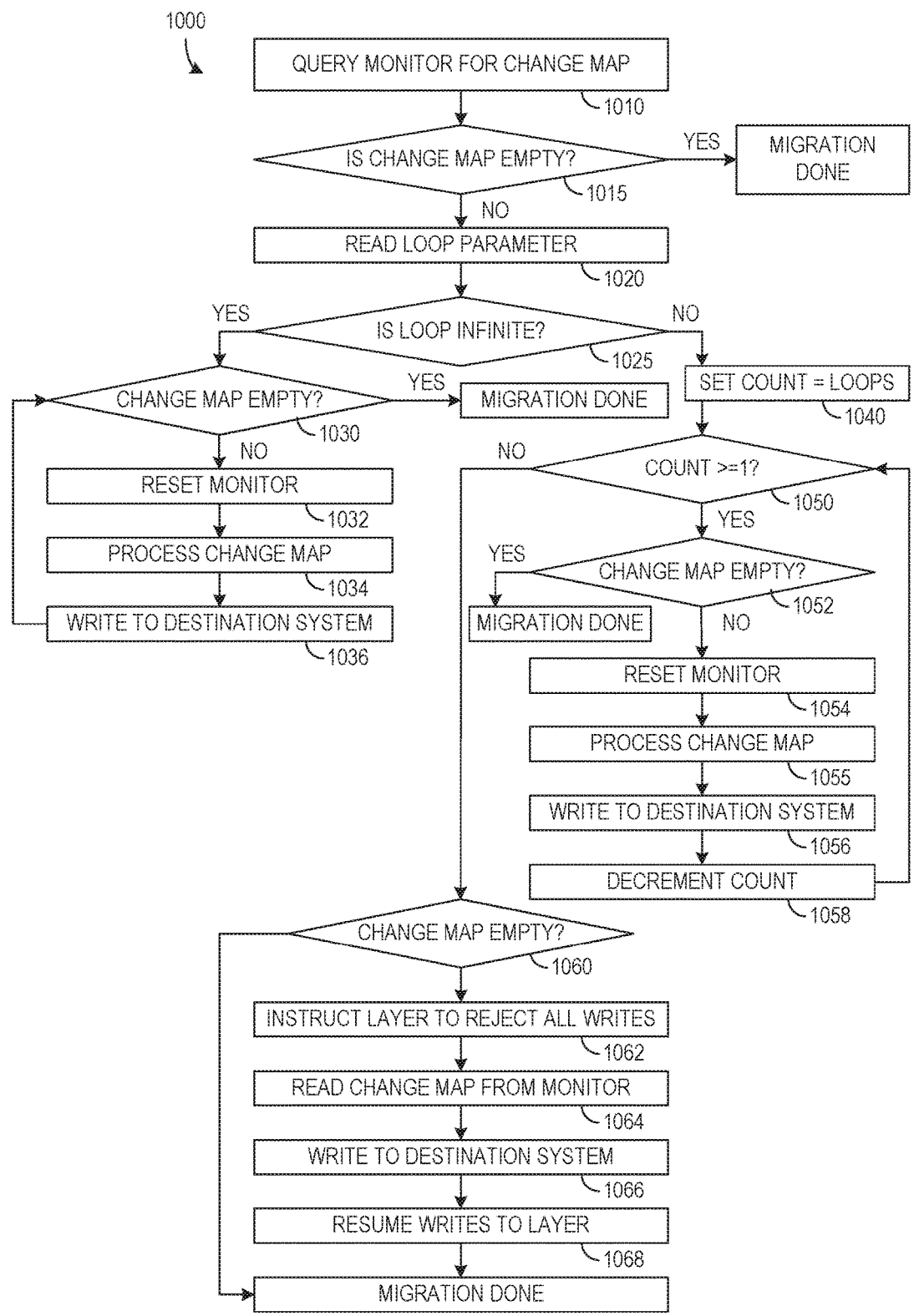
FIG. 10 is a flow diagram of one implementation of a process for handling data changes that occur during a data migration process.

An implementation of a change process 1000 with zero or minimal downtime is illustrated in the flow diagram of FIG. 10. Process 1000 uses a configuration parameter "Loops" that signifies a maximum number of cycles of data change that the migration engine should perform so that source system can continue to accept changes during data migration, including changes during the data correction portion of the data migration process. The Loops parameter can be given a value to signify infinite (e.g., −1) or a specific number N where N is an integer greater than or equal to one. If the Loops parameter is infinite, process 1000 relies on there being some time in the future when there will be no changes, so that the change map will empty. At that point, migration can complete without downtime.

Process 1000 as shown in FIG. 10 begins in a process block 1010 in which the migration engine queries the change monitor for a change map. If a decision block 1015 determines the change map is empty, i.e., does not contain any changes, no changes are required, and the migration is complete. If the change map is not empty, a process block 1020 reads the Loops parameter, and a decision block 1025 determines whether the Loops parameter is infinite.

If the Loops parameter is infinite then, a decision block 1030 again reads the change map from the change monitor and determines if the change map is then empty. Again, the migration is complete if decision block 1030 determines that the change map is empty, which should not occur on the first execution of decision block 1030. If decision block 1030 determines that the change map is not empty, the change monitor is reset or restarted in a process block 1032, the most recently read change map is processed in process block 1034, and changes according to the most recently read change map are written to the destination system in process block 1036. Process 1000 then branches from process block 1036 back to decision step 1030, which reads a new change map from the change monitor and determines whether the just read change map is empty. If the Loops parameter is infinite, a loop including blocks 1030, 1032, 1034, and 1036 will continue until there are no changes in the data during the execution of a loop. Accordingly, process 1000 upon reaching decision block 1030 continues to loop until such time (if any) that no further data changes occur while the last group of changes are processed.

If the Loops parameter is finite, process 1000 branches from decision block 1025 to a process block 1040 that sets a count index equal to the Loops parameter. A decision block 1050 then determines if the count index is greater than one. If the count index is greater than one, a decision step 1052 reads the change map from the change monitor and determines whether the change map is then empty. If so, the migration process is complete. If not, a migration engine resets the change monitor in a process block 1054, processes the change map in a process block 1055 so that a process block 1056 can write changes from the change map to the destination system. Process block 1058 then decrements the count index before process 1000 branches back to decision block 1050. A loop including blocks 1050, 1052, 1054, 1055, 1056, and 1058 then repeats until either decision block 1052 determines that the change map is empty or decision block 1050 determines that the count index has decremented to zero. Process 1000 thus cycles through the loop including blocks 1050, 1052, 1054, 1055, 1056, and 1058 up to the number of times set in the Loops parameter.

If the count index reaches zero, process 1000 branches from decision block 1050 to a decision block 1060. Decision block 1060 again reads the change map from the change monitor, and if the change map is empty, the migration process is done. If decision block 1060 determines that the change map is not empty, a process block 1062 temporarily prevents further changes to the data, e.g., by instructing the appropriate subsystem to reject write operations to the data being migrated. A process block 1064 then reads the change map from the change monitor. A process block 1066 writes the changes to the destination system, and a process block 1068 resumes writes to the data now in the destination system. Migration is thus done.

All or portions of some of the above-described systems and methods can be implemented in a computer-readable media, e.g., a non-transitory media, such as an optical or magnetic disk, a memory card, or other solid state storage containing instructions that a computing device can execute to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A process for migrating data, comprising:
analyzing data to be migrated from a first device, to identify data blocks containing content that is the same at an abstraction layer in the data;
constructing a content map having a plurality of entries respectively corresponding to a plurality of unique contents found at the abstraction layer, wherein each of the entries includes a list of one or more addresses at which the unique content corresponding to the entry can be found in the first device;
sending the unique contents from the first device to a second device;
writing the unique contents in the second device at addresses selected based on the content map and using the abstraction layer in the second device;
monitoring changes in the data that occur while analyzing the data, constructing the content map, sending the unique contents, and writing the unique content;
constructing a change map identifying the changes; and
correcting the contents in the second device to reflect the changes,
wherein correcting the contents comprises:
(a.) reading the change map from a monitor that constructs the change map;
(b.) resetting the monitor to begin monitoring of further changes to the data and begin constructing of a new change map;
(c.) in response to the change map most recently read from the monitor being empty, ending the migration process; and
(d.) in response to the change map most recently read from the monitor not being empty, correcting the data in the second device to reflect the changes in the change map most recently read from the monitor.

2. The process of claim 1, further comprising repeating (a.), (b.), (d.) multiple times before performing (c.).

3. The process of claim 1, further comprising:
limiting repetitions of (a.), (b.), and (d.) to a fixed number of times; and
in response to (a.), (b.), and (d.) being repeated the fixed number of times, halting further changes to the data and correcting the data in the second device to reflect changes in a last change map in the monitor.

4. The process of claim 1, wherein analyzing the data comprises identifying the blocks using the abstraction layer.

5. A computer system comprising:
a first device;
a second device;
a first set of code that, when executed by the first device, performs a method comprising:
analyzing data to be migrated from the first device, to identify data blocks containing content that is the same at an abstraction layer in the data;
constructing a content map having a plurality of entries respectively corresponding to a plurality of unique contents found at the abstraction layer, wherein each of the entries includes a list of addresses at which the unique content corresponding to the entry can be found in the first device;
sending the unique contents from the first device to the second device; and
a second set of code that, when executed by the second device, performs a method comprising:
writing the unique contents in the second device at addresses selected based on the content map and using the abstraction layer in the second device;
monitoring changes in the data that occur while analyzing the data, constructing the content map, sending the unique contents, and writing the unique content;
constructing a change map identifying the changes; and
correcting the contents in the second device to reflect the changes,
wherein correcting the contents comprises:
(a.) reading the change map from a monitor that constructs the change map;
(b.) resetting the monitor to begin monitoring of further changes to the data and begin constructing of a new change map;
(c.) in response to the change map most recently read from the monitor being empty, ending the migration process; and
(d.) in response to the change map most recently read from the monitor not being empty, correcting the data in the second device to reflect the changes in the change map most recently read from the monitor.

6. A migration engine comprising:
a processor configured to:
analyze data to be migrated from a first device, to identify data blocks containing content that is the same at an abstraction layer in the data;
a content mapping module implemented in a computer system to construct a content map of data on a first device in the computer system, wherein the content map includes a plurality of entries respectively corresponding to a plurality of unique contents found at an abstraction layer in the data, each of the entries including a list of addresses at which the unique content corresponding to the entry can be found on the first device; and
a content writing module implemented in the computer system to send unique contents from the first device to the second device and to write the unique contents in the second device at addresses selected based on a content map and using the abstraction layer in the second device;
the processor:
monitoring changes in the data that occur while analyzing the data, constructing the content map, sending the unique contents, and writing the unique content;
constructing a change map identifying the changes; and
correcting the contents in the second device to reflect the changes, wherein correcting the contents comprises:
(a.) reading the change map from a monitor that constructs the change map;
(b.) resetting the monitor to begin monitoring of further changes to the data and begin constructing of a new change map;
(c.) in response to the change map most recently read from the monitor being empty, ending the migration process; and
(d.) in response to the change map most recently read from the monitor not being empty, correcting the data in the second device to reflect the changes in the change map most recently read from the monitor.

7. The migration engine of claim 6, further comprising a change monitor implemented in the computer system to detect changes in the data during operation of the content mapping module or the content writing module.

8. The migration engine of claim 6, wherein the content writing module further operates to respond to (a.) and (b.) being repeated a fixed number of times by halting further changes to the data and correcting the data in the second device to reflect changes in a last change map in the monitor.

9. The migration engine of claim 6, wherein the content mapping module comprises means for constructing the content map of data on the first device in the computer system.

10. The migration engine of claim 6, wherein the content writing module comprises means for sending the unique contents from the first device to the second device and for writing the unique contents in the second device at addresses selected based on the content map.

11. The computing system of claim 5, wherein the first and second sets of code comprise a migration engine and:
the first set of code includes a content mapping module implemented in a computer system to construct a content map of data on a first device in the computer system, wherein the content map includes a plurality of entries respectively corresponding to a plurality of unique contents found at an abstraction layer in the data, each of the entries including a list of addresses at which the unique content corresponding to the entry can be found on the first device; and
the second set of code includes a content writing module implemented in the computer system to send unique contents from the first device to the second device and to write the unique contents in the second device at addresses selected based on a content map.

12. The computing system of claim 11, wherein the migration engine further comprises a change monitor to detect changes in the data during operation of the content mapping module or the content writing module.

13. The computing system of claim 12, wherein the change monitor operates to:
monitor changes in the data that occur during analysis of the data, construction the content map, sending of the unique contents, and writing of the unique content; and
construct a change map identifying the changes.

14. The computing system of claim 13, wherein the content writing module operates to:
(a.) read the change map from the monitor;
(b.) respond to the change map most recently read from the monitor not being empty by correcting the data in the second device to reflect the changes in the change map most recently read from the monitor; and
(c.) respond to the change map most recently read from the monitor being empty by ending the migration process.

15. The computing system of claim 14, wherein the content writing module further operates to respond to (a.) and (b.) being repeated a fixed number of times by halting further changes to the data and correcting the data in the second device to reflect changes in a last change map in the monitor.

16. The computing system of claim 11, wherein:
the content mapping module comprises means for constructing the content map of data on the first device in the computer system; and
the content writing module comprises means for sending the unique contents from the first device to the second device and for writing the unique contents in the second device at addresses selected based on the content map.

* * * * *